United States Patent [19]

Yoshikawa et al.

[11] Patent Number: 5,196,773
[45] Date of Patent: Mar. 23, 1993

[54] CONTROLLER FOR RIVETTING MACHINE

[75] Inventors: Seiichi Yoshikawa, Higashiosaka; Minoru Yamada, Osaka; Shuichi Nakagawa, Suita; Kazuo Kobayashi, Katano, all of Japan

[73] Assignee: Yoshikawa Iron Works Ltd., Osaka, Japan

[21] Appl. No.: 665,217

[22] Filed: Mar. 5, 1991

[51] Int. Cl.$^5$ .............................................. H02P 7/00
[52] U.S. Cl. ..................................... 318/561; 318/602; 318/645; 318/652; 364/474.02; 364/474.15; 364/474.28; 364/476
[58] Field of Search .................. 318/560, 561, 600–602, 318/652, 645; 408/8–13; 227/51, 53, 107, 140; 364/474.01, 474.02, 474.11, 474.12, 474.15, 474.28, 474.32, 474.35, 476

[56] References Cited

U.S. PATENT DOCUMENTS

| | | | |
|---|---|---|---|
| 3,970,830 | 7/1976 | White et al. | 318/567 X |
| 4,157,231 | 6/1979 | Phillips | 364/474.15 X |
| 4,233,491 | 11/1980 | Maruyama et al. | 318/572 X |
| 4,570,385 | 2/1986 | Richter et al. | 364/474.22 |

Primary Examiner—William M. Shoop, Jr.
Assistant Examiner—David Martin
Attorney, Agent, or Firm—Wenderoth, Lind & Ponack

[57] ABSTRACT

A rivetting machine has a hydraulic cylinder connected with a hydraulic power source, the cylinder including a piston shaft, a motor-driven spindle extending through and journaled to the piston shaft, and a rivet head forming tool secured to the bottom end of the spindle and carrying a forming shaft. A controller of the machine has a linear encoder for detecting the axial position of the piston shaft, an electric hydraulic servo valve provided in a hydraulic circuit between the hydraulic power source and the hydraulic cylinder, a machining data input unit for inputting machining data of the work rivet into a programmable control unit. The control unit receives the output of the linear encoder and the input machining data and controlling the hydraulic cylinder via the electric/hydraulic servo valve based on the machining data and the output of the encoder.

10 Claims, 4 Drawing Sheets

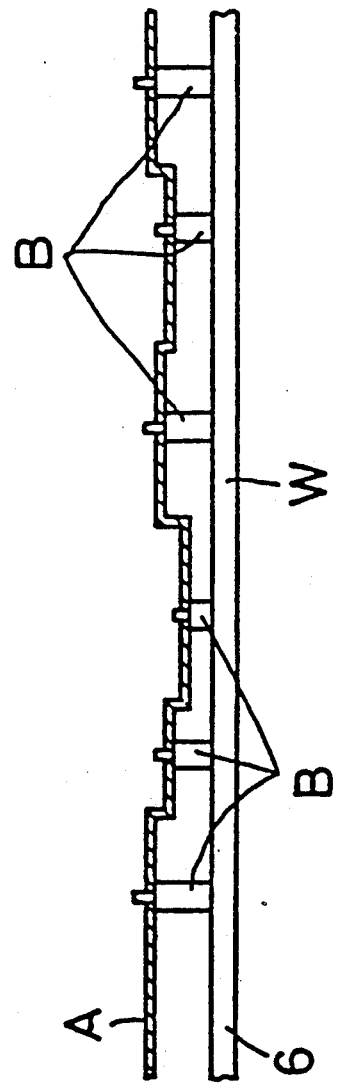

CONTROLLER FOR RIVETTING MACHINE

BACKGROUND OF THE INVENTION

This invention relates to a controller for a rivetting machine which makes it possible to carry out rivetting automatically by simply inputting data of machining characteristics.

A rivetting machine is known which comprises a motor-driven spindle extending through and journaled to a piston shaft of a hydraulic cylinder connected to a hydraulic power source, and a rivet head forming tool having a forming shaft and secured to the bottom end of the spindle. The spindle is lowered by extending the hydraulic cylinder to press the bottom end face of the forming shaft against the top end face of a work rivet by the hydraulic force acting on the piston shaft and at the same time the spindle is rotated by the motor. Thus a rivet head is formed on the work rivet.

Since the work rivets placed on the work table are of various heights according to the products to be formed, it is necessary to adjust the length of the stroke of the hydraulic cylinder. For this purpose, a mechanical stroke adjusting structure was used. Such a structure may be a stopper plate provided around the piston shaft of the hydraulic cylinder so that its vertical position will be adjustable by use of an index motor or the like. In this arrangement, the lower limit of the stroke of the piston shaft is set by abutting a member fixed to the piston shaft against the stopper plate when the piston shaft is moved down. Also, such a structure may comprise a disc member provided around the piston shaft and having stopper pins of different heights protruding upwardly therefrom, and a plate-like member integral with the piston shaft and provided with a pin extending downwardly. As the piston is lowered, the pin at the side of the piston shaft will abut one of the stopper pins selected by turning the disc member. Thus the lower limit of the stroke of the piston shaft is set.

In order to position a work rivet with respect to the forming shaft by moving a work table a plane (X-Y plane) perpendicular to the hydraulic cylinder in X-Y directions relative to the forming tool, a manual or motor-driven ball screw type table moving mechanism was used.

But the above-described prior art mechanical stroke adjusting structure not only required extra parts such as an index motor and stopper means but the stroke adjustment was very troublesome. These problems have been big obstacles to full automation of rivetting work. Also, since a stepless adjustment of the stroke was difficult, a special stopper had to be prepared when forming an off-specification work rivet. This incurs extra labor and costs.

Further, the ball-screw type mechanism for moving the X-Y table has a problem in that its moving speed is slow. If the moving speed is increased, the positioning accuracy worsens. Further, since wear on the ball-thread can also lower the positioning accuracy, frequent lubrication and exchange of parts are necessary. This also increases the cost.

Further, the setting of caulking pressure had to be carried out by manually adjusting the working pressure of the relief valve according to the diameter of each rivet and its material. This is also troublesome and has been another obstacle to the automation of rivetting work.

SUMMARY OF THE INVENTION

An object of the present invention is to provide a controller for a rivetting machine which is capable of adjusting the stroke of the hydraulic cylinder with high accuracy by controlling the hydraulic pressure, which is capable of positioning the work table relative to the hydraulic cylinder, i.e. X-Y axis control, with high accuracy, and which facilitates an automatic setting of caulking pressure and thus the automation of the rivetting work.

In the controller for a rivetting machine of this invention, the control unit automatically calculates the length of stroke of the hydraulic cylinder according to the data on a work rivet to be formed, such as its length and actuates a servo valve to lower the piston shaft of the hydraulic cylinder until the output of linear encoder indicates that the piston shaft is at the lower limit of the calculated length of its stroke (extension mode). When the piston shaft reaches its lower limit, the control unit switches the servo valve to a reverse position to raise the piston shaft (retraction mode). When the output of the linear encoder indicates the upper limit of stroke, the servo valve is switched back to its neutral position to stop the hydraulic cylinder in preparation for the forming of the next work rivet.

With the controller for a rivetting machine according to this invention, since the hydraulic pressure for pressing a work rivet with the forming shaft of the rivet head forming tool mounted on the bottom end of the spindle shaft is controlled according to the output signals of the linear encoder, it can be used for the positioning of the spindle shaft. This eliminates the need for any mechanical stroke adjusting means.

With the controller for a rivetting machine of this invention, the working pressure of the electromagnetic pressure control valve is set automatically by the control unit depending upon the diameter of the work rivet and its material. Thus, the rivetting can be done automatically at a caulking pressure suitable for each work rivet. It can be checked whether or not there is a work rivet at a predetermined machining position. This further improves the accuracy of rivet forming.

With the controller for a rivetting machine of this invention, the control unit not only controls the stroke in the direction of extension and retraction (in the direction of Z-axis), but also controls the positioning of the work table by controlling the hydraulic cylinders for the respective shafts with the X-axis servo valve and the Y-axis servo valve while feeding back the position information from the X- and Y- axis linear encoders. This allows a quick positioning of the work table without the need for a limit switch or a stopper.

According to this invention, the stroke of the spindle shaft of a rivetting machine can be variably set by simply inputting machining data. Further, the machining can be done automatically according to the setting with high accuracy. Thus, the rivetting efficiency and the quality of the rivets thus made improve greatly. Also, the work table can be positioned quickly and accurately utilizing hydraulic pressure. This facilitates a fully automated, laborsaving rivetting operation. Its maintainance is also less troublesome because no ball-screw is used.

BRIEF DESCRIPTION OF THE DRAWING

Other features and objects of the present invention will become apparent from the following description taken with reference to the accompanying drawings, in which:

FIG. 4 is a explanatory view of one example of the work table; and

DETAILED DESCRIPTION OF THE PREFERRED EMBODIMENT

Now, one embodiment of the controller for a rivetting machine according to this invention will be described with reference to the drawings.

Figure 1:
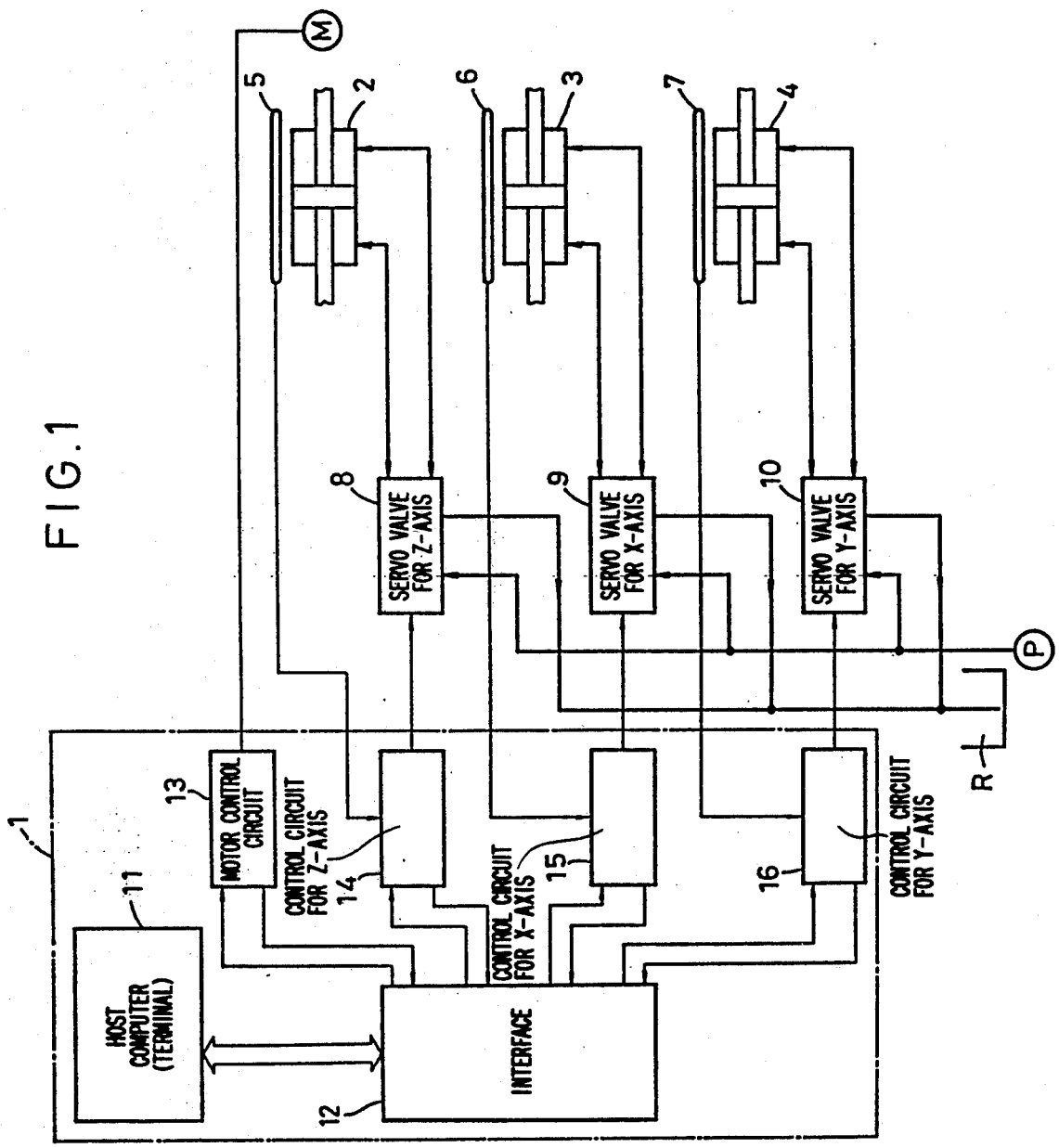
FIG. 1 is a block diagram of one embodiment of the controller for a rivetting machine according to this invention.

FIG. 1 shows the basic structure of this embodiment in which the controller shown comprises a control unit 1, a Z-axis linear encoder 5 mounted on a Z-axis hydraulic cylinder 2 for moving a rivetting spindle S (FIG. 2) in the direction of the Z-axis (vertically) to detect the position of the spindle S in the direction of the Z-axis, and an X-axis linear encoder 6 and a Y-axis linear encoder 7 provided parallel to an X-axis hydraulic cylinder 3 and a Y-axis hydraulic cylinder 4. The hydraulic cylinders 3 and 4 move a work table W respectively, in the directions of X-axis and Y-axis, respectively. The work table W lies in a plane perpendicular to the spindle S and is adapted to support a work rivet. The encoders 6 and 7 thus detect the position of the work table in the directions of the X-axis and Y-axis. The controller further comprises a Z-axis servo valve 8, an X-axis servo valve 9 and a Y-axis servo valve 10 for controlling the Z-axis hydraulic cylinder 2, the X-axis hydraulic cylinder 3 and the Y-axis hydraulic cylinder 4, respectively. In the drawings, M indicates a driving motor for the spindle S, P is a hydraulic pump as a hydraulic power source, and R is an oil reservoir.

The control unit 1 of this embodiment comprises a host computer 11, an interface 12, a motor control circuit 13 for controlling the driving motor M, and a Z-axis control circuit 14, an X-axis control circuit 15 and a Y-axis control circuit 16 for controlling the Z-, X- and Y-axis servo valves 8, 9 and 10, respectively.

Figure 2:
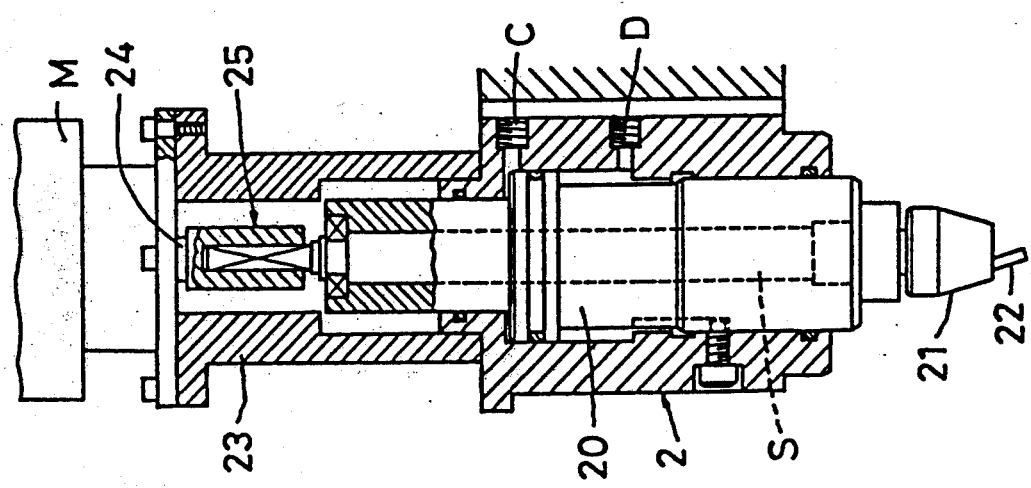
FIG. 2 is a sectional view of one example of the Z-axis hydraulic cylinder.

FIG. 2 shows the detailed structure of an example of the Z-axis hydraulic cylinder 2. It has a piston shaft 20 moved up and down under the action of the hydraulic oil supplied and discharged through ports C and D, and a spindle S extending through the piston shaft 20 and journaled thereto. The spindle S is provided at its bottom end with a rivet head forming tool 21 having a forming shaft 22 secured to the bottom thereof. The forming shaft 22 has its bottom end as a forming surface, aligned with the axis of the spindle S and its top end offset therefrom.

In this arrangement, when the forming tool 21 is rotated by the spindle S, the forming shaft 22 is rotated, forming an inverted cone with the forming surface as its apex. The driving motor M is mounted on the Z-axis hydraulic cylinder 2 through a spacer 23. It has its output shaft 24 connected with the spindle S through a universal joint 25. But it does not have to be connected through the universal joint 25 but through an ordinary joint so that the motor M will move up and down together with the spindle S.

When rivetting with the Z-axis hydraulic cylinder 2, as shown in FIG. 4 by way of example, rivets B (work rivets) are placed on the work table W with their heads received in holes formed in a product sheet A. In this state, the work table W is moved in the X and Y directions to bring the rivets into alignment with the spindle S one after another. Then the spindle S is lowered by a predetermined stroke together with the piston shaft 20. The bottom end face of the forming shaft 22 will come into abutment with the top end face of the work rivet B at a point slightly higher than the lower limit of the stroke. As the spindle S is turned in this state by the driving motor M while pressing the work rivet B by the hydraulic force transmitted to the spindle S through the piston shaft 20, the head of the work rivet B will be caulked, so that when the piston shaft 20 has reached the lower end of stroke, a rivet head of a required size is formed. In this state, the piston shaft 20 is raised and the work table W is moved for the forming of the next work rivet B.

In this embodiment, the order of forming of a plurality of work rivets B and their heights (lengths) are preset in the host computer 11 in the control unit 1. The host computer 11 calculates the stroke of the spindle S and the movement of the work table W according to these preset data and issues the results of the calculations to the Z-, X- and Y-axis control circuits 14, 15 and 16 through the interface 12. Also, it issues a command the timing regarding under which the driving motor M is to be actuated to the motor control circuit 13. The driving motor M may be kept activated throughout the period the spindle 20 is moving down (it may be driven continuously) or it may be activated immediately before the bottom end face of the rivet forming tool 21 comes into abutment with the top end face of the work rivet B and kept activated until its stroke reaches its lower limit.

When the X-axis control circuit 15 and the Y-axis control circuit 16 receive the commands from the host computer 11, they will electrically control the X-axis servo valve 9 and the Y-axis servo valve 10, respectively, to activate the X-axis cylinder 3 and the Y-axis cylinder 4, while detecting the position of the work table W in the X- and Y-axis directions by means of the X- and Y-axis linear encoders 6 and 7. Thus, the work table W is moved to the designated position by the host computer 11, so that the target work rivet B will be brought into alignment with the axis of the spindle S in the Z-axis cylinder 2. Then, the Z-axis control circuit 14 will electrically control the Z-axis servo valve 8 to activate the Z-axis hydraulic cylinder 2, while feeding back the position of the spindle S through the Z-axis linear encoder 5, so that the spindle S will be lowered to the lower end of its stroke as commanded by the host computer 11.

During this downward stroke, the bottom end face of the forming shaft 22 will come into abutment with the top end face of the work rivet B. In this state, the spindle 20 is rotated by the driving motor M, while pressing the work rivet B by the hydraulic force transmitted to the spindle S through the piston shaft 20. Thus, when the spindle S reaches the lower limit of its stroke, a rivet head of a desired size will be formed. The information that the spindle S has reached its lower limit is fed back by the Z-axis linear encoder 5. In response to this information, the driving motor M is stopped by the motor control circuit 13 and the Z-axis servo valve 8 is switched to a position reverse to the descent position by the Z-axis control circuit 14 to actuate the Z-axis hydraulic cylinder 2 so as to raise the spindle S. In FIG. 1, arrows in thin solid lines indicate the flow of electrical signal and the thick lines indicate the flow of hydraulic oil.

Figure 3:
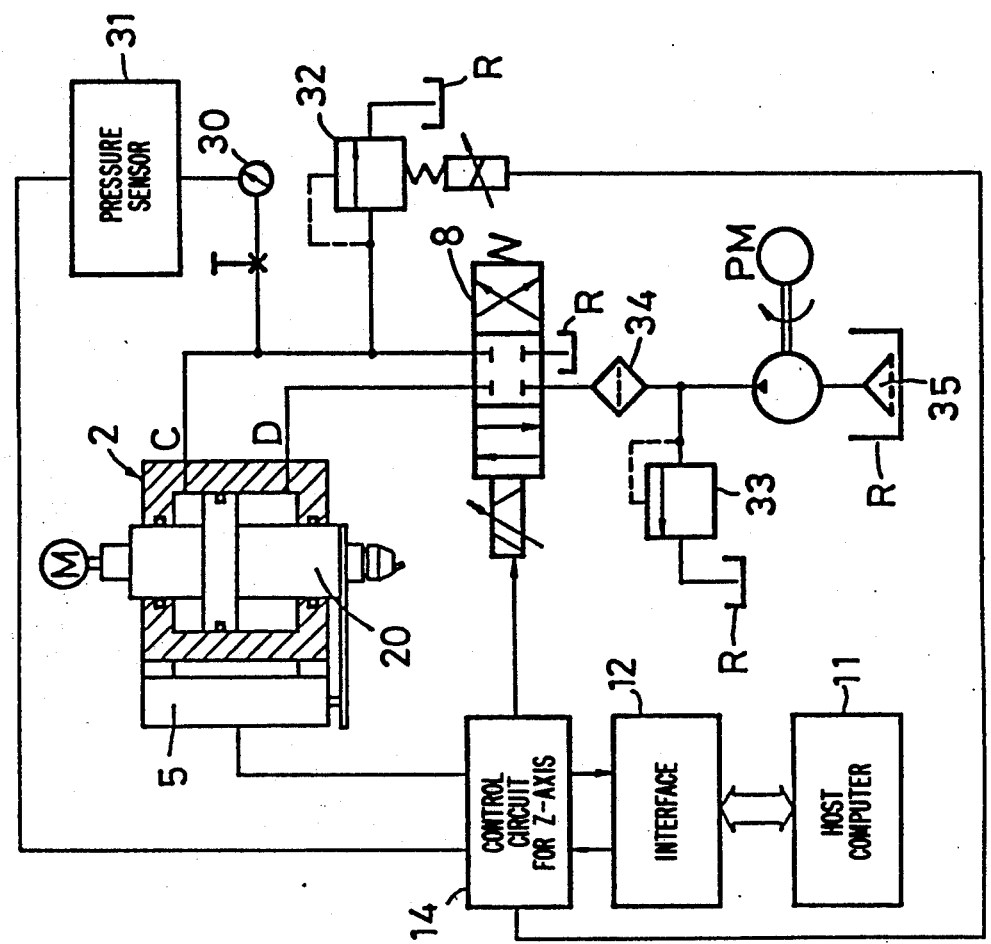
FIG. 3 is a hydraulic circuit diagram of one example of the hydraulic system of the above embodiment.

FIG. 3 shows the detailed structure of an example of the Z-axis system. In the illustrated hydraulic system, the Z-axis servo valve 8 is a double-coil type 4-port, 3-position servo valve. The coil of the servo valve is energized by the output current from the Z-axis control circuit 14 to which the signal representing the piston of the spindle S is fed back by the Z-axis linear encoder 5. The state of energization of the coil is charged to change the position of the valve 8. Thus, the ports C and D in the Z-axis hydraulic cylinder 2 are selectively used to introduce oil pressure from the oil pump P into the cylinder 5 and to discharge the oil therefrom into the oil reservoir R. During the rivetting operation, the control unit 1 controls the Z-axis servo valve 8 in such a way as to extend the Z-axis hydraulic cylinder 5 quickly (fast feed) until it approaches the head of the work rivet, extend it at a suitable predetermined speed (slow feed) while caulking the head, and move it backward (retract) at a high speed again after caulking. In this case, the feed speed can be controlled in a stepless manner.

In this embodiment, the pipe line in the presure increase system extending from the Z-axis servo valve 8 to the port C in the Z-axis hydraulic cylinder 2 contains a pressure sensor 31 for converting the pressure in the pipe line (numeral 30 indicates a pressure gauge) into electric signals to supply them to the Z-axis control circuit 14, and an electromagnetic pressure control valve (relief valve) 32. The working pressure of the valve 32, i.e. the caulking pressure of the Z-axis hydraulic cylinder 2, is set automatically by a program through the Z-axis control circuit 14 according to the respective rivets. Also, the pressure in the pressure increase system of the Z-axis hydraulic cylinder 2 is monitored by the controller 1 through the pressure sensor 31. If the oil pressure fails to increase even when the piston 20 reaches its predetermined stroke during the pressure increase mode of the Z-axis hydraulic cylinder, the controller 1 will judge that the work rivet is missing. In this way, it can be checked whether or not a work rivet is in each rivet hole formed in the product sheet A at predetermined points. Numeral 33 designates a relief valve, 34 and 35 filters and PM a pump motor. The X- and Y-axis systems may be of the same structure as the Z-axis system except that there are not provided the spindles, the driving motor M and the solenoid relief valve 32. Thus, their detailed description is omitted.

The rivet head forming tool 21 may be detachably mounted (FIG. 2) so that a press jig (not shown) for press-fitting a work rivet B in a rivet hole in the product sheet A can be mounted in place of the rivet head forming tool. With this arrangement, the controller for a rivetting machine according to this invention can also be used as a controller for a rivet press.

Figure 5:
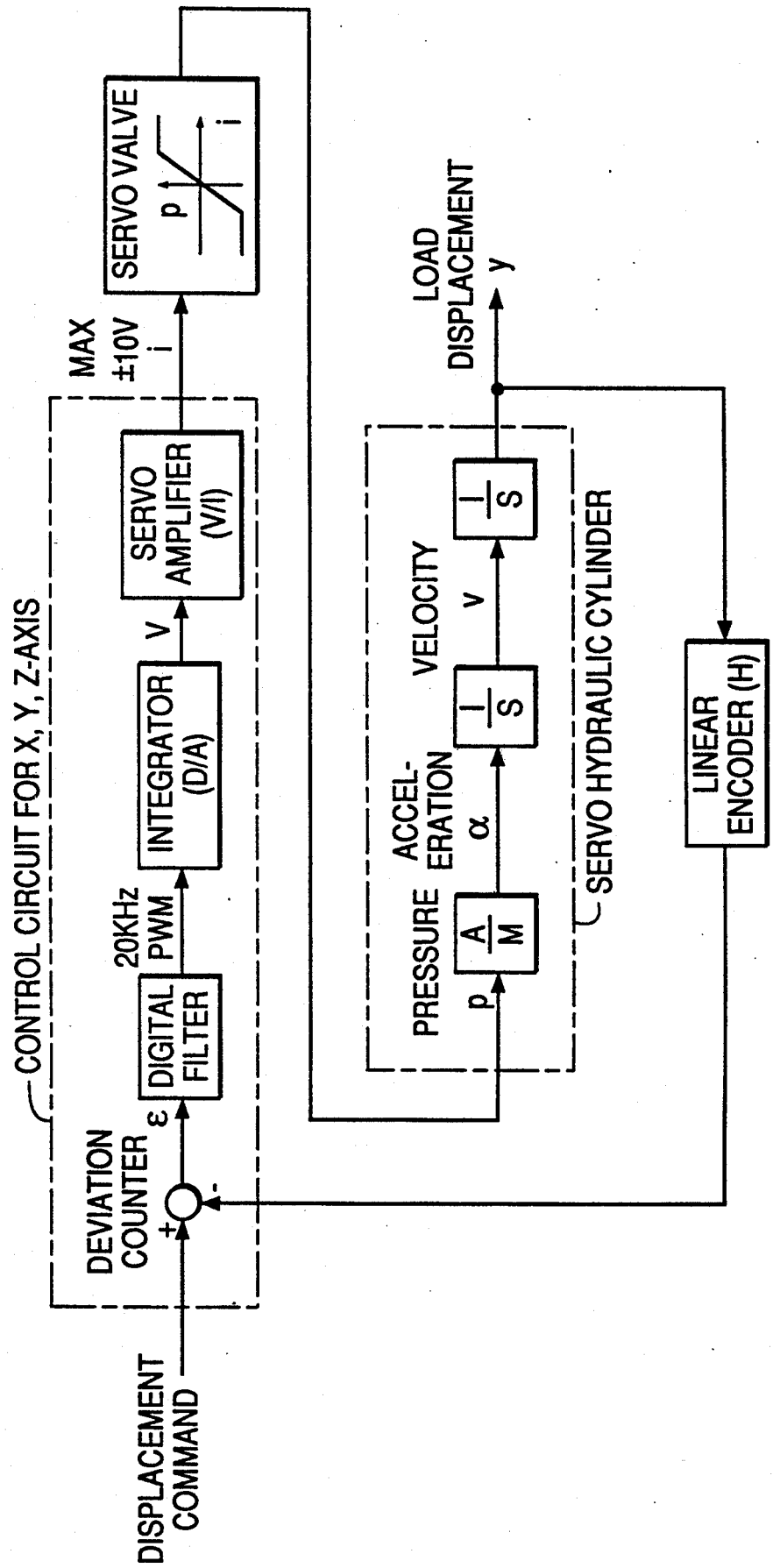
FIG. 5 is a block diagram of the loop structure of the control system of another embodiment.

According to this invention, a servo loop for the electric system and the hydraulic system comprising electric and mechanical elements as shown in FIG. 5 may be used to carry out the position control as an acceleration-load control. This arrangement makes it possible to control the servo hydraulic cylinder in a PLL (phase locked loop) state without any delay in position and thus to remarkably improve the accuracy of rivetting work.

What is claimed is:

1. A controller of a rivetting machine having a hydraulic cylinder, and a motor and a hydraulic power source connected to said hydraulic cylinder, the cylinder including a piston shaft, a spindle extending through and journaled to said piston shaft and driven by said motor, a rivet head forming tool secured to the bottom end of said spindle, and a forming shaft supported by said rivet head forming tool, whereby said spindle is lowerable by said hydraulic cylinder to cause abutting contact between the bottom end face of said forming shaft and the top end face of a work rivet and at the same time said spindle is rotatable by said motor to form a rivet head on the work rivet with said forming shaft, said controller comprising:

a linear encoder in operative association with said piston shaft so as to detect the axial position of said piston shaft;

an electric/hydraulic servo valve provided in a hydraulic circuit between said hydraulic power source and said hydraulic cylinder so as to control the flow of hydraulic fluid to and from said hydraulic cylinder, said hydraulic circuit including a hydraulic line extending to said hydraulic cylinder;

an electromagnetic pressure control valve operatively hydraulically connected in said hydraulic line so as to control the pressure of hydraulic fluid flowing therethrough to said cylinder;

a control unit programmable to receive machining data for rivets to be worked by the rivetting machine, said control unit being operatively connected to said linear encoder so as to receive the output of said linear encoder, said control unit being operatively connected to hydraulic cylinder via said electric/hydraulic servo valve so as to control said hydraulic cylinder by controlling the position of said electric/hydraulic servo valve based on the machining data and the output of said linear encoder, and said control unit being operatively connected to said electromagnetic pressure control valve so as to control said electromagnetic pressure control valve to regulate the pressure of hydraulic fluid flowing through said hydraulic line to be no higher than a predetermined pressure established by the machining data for a rivet to be worked.

2. A controller of a rivetting machine as claimed in claim 1 and in which machine the rivet head forming tool is detachably secured to the end of said spindle, and a press jig is detachably securable to the bottom end of said spindle in place of said rivet head forming tool whereby the press jig when secured to the bottom end of said spindle can press-fit rivets into holes formed in a sheet when said piston shaft is extended, said controller further comprising a pressure sensor operatively connected to said hydraulic line so as to sense the pressure of hydraulic fluid in said hydraulic line, and wherein said control unit is also operatively connected to said pressure sensor so as to monitor the pressure in said hydraulic line and effect a control of said hydraulic circuit, while the pressure in said hydraulic line is monitored, which selectively operates said hydraulic cylinder in a rivet head forming mode when said rivet head forming tool is secured to the bottom end of said spindle and a press-fitting mode when the press jig is secured to the bottom end of said spindle.

3. A controller of a rivetting machine as claimed in claim 2 and in which machine a work table is movable relative to said spindle in X and Y directions in a plane extending perpendicular to the longitudinal axis of said spindle, and X-axis and Y-axis hydraulic cylinders are operatively connected to said work table so as to move said work table in said X and Y directions to locate work rivets supported on said work table at a predetermined position relative to said spindle, and further comprising an X-axis linear encoder and a Y-axis linear encoder in operative association with said work table so as to detect the position of said work table in said plane relative to said piston shaft, respective electric/hydraulic servo valves provided in respective hydraulic circuits between said hydraulic power source and said X-axis and said Y-axis cylinders, respectively, so as to control the flow of hydraulic fluid to and from said X-axis and said Y-axis cylinders, and wherein said control unit is operatively connected to said X-axis and said Y-axis linear encoders so as to receive the output of said X-axis and said Y-axis linear encoders, and said control unit is operatively connected to said X-axis and said Y-axis cylinders via said respective electric/hydraulic servo valves so as to control said X-axis and said Y-axis cylinders by controlling the positions of said respective electric/hydraulic servo valves based on the machining data and the output of said X-axis and said Y-axis linear encoders.

4. A controller of a rivetting machine as claimed in claim 1 and in which machine a work table is movable relative to said spindle in X and Y directions in a plane extending perpendicular to the longitudinal axis of said spindle, and X-axis and Y-axis hydraulic cylinders are operatively connected to said work table so as to move said work table in said X and Y directions to locate work rivets supported on said work table at a predetermined position relative to said spindle, and further comprising an X-axis linear encoder and a Y-axis linear encoder in operative association with said work table so as to detect the position of said work table in said plane relative to said piston shaft, respective electric/hydraulic servo valves provided in respective hydraulic circuits between said hydraulic power source and said X-axis and said Y-axis cylinders, respectively, so as to control the flow of hydraulic fluid to and from said X-axis and said Y-axis cylinders, and wherein said control unit is operatively connected to said X-axis and said Y-axis linear encoders so as to receive the output of said X-axis and said Y-axis linear encoders, and said control unit is operatively connected to said X-axis and said Y-axis cylinders via said respective electric/hydraulic servo valves so as to control said X-axis and said Y-axis cylinders by controlling the positions of said respective electric/hydraulic servo valves based on the machining data and the output of said X-axis and said Y-axis linear encoders.

5. A controller of a rivetting machine having a hydraulic cylinder, and a motor and a hydraulic power source connected to said hydraulic cylinder, the cylinder including a piston shaft, a spindle extending through and journaled to said piston shaft and driven by said motor, a rivet head forming tool secured to the bottom end of said spindle, and a forming shaft supported by said rivet head forming tool, whereby said spindle is lowerable by said hydraulic cylinder to cause abutting contact between the bottom end face of said forming shaft and the top end face of a work rivet and at the same time said spindle is rotatable by said motor to form a rivet head on the work rivet with said forming shaft, said controller comprising:

a linear encoder in operative association with said piston shaft so as to detect the axial position of said piston shaft;

an electric/hydraulic servo valve provided in a hydraulic circuit between said hydraulic power source and said hydraulic cylinder so as to control the flow of hydraulic fluid to and from said hydraulic cylinder, said hydraulic circuit including a hydraulic line extending to said hydraulic cylinder;

a pressure sensor operatively connected to said hydraulic line so as to sense the pressure of hydraulic fluid in said hydraulic line; and a control unit programmable to receive machining data for rivets to be worked by the riveting machine, said control unit being operatively connected to said linear encoder so as to receive the output of said linear encoder, said control unit being operatively connected to said hydraulic cylinder via at least said electric/hydraulic servo valve so as to control said hydraulic cylinder by controlling the position of said electric/hydraulic servo valve based on the machining data and the output of said linear encoder, and said control unit also being operatively connected to said pressure sensor so as to monitor the pressure in said hydraulic line and effect a control of said electric/hydraulic servo valve, based on said monitoring of the pressure in said hydraulic line during an extension of said piston shaft, which causes said piston shaft to retract when said piston shaft has moved a predetermined stroke without the pressure in said hydraulic line having increased thereby detecting that a rivet is not disposed in a position to be worked by said forming shaft.

6. A controller of a rivetting machine as claimed in claim 5 and in which machine a work table is movable relative to said spindle in X and Y directions in a plane extending perpendicular to the longitudinal axis of said spindle, and X-axis and Y-axis hydraulic cylinders are operatively connected to said work table so as to move said work table in said X and Y directions to locate work rivets supported on said work table at a predetermined position relative to said spindle, and further comprising an X-axis linear encoder and a Y-axis linear encoder in operative association with said work table so as to detect the position of said work table in said plane relative to said piston shaft, respective electric/hydraulic servo valves provided in respective hydraulic circuits between said hydraulic power source and said X-axis and said Y-axis cylinders, respectively, so as to control the flow of hydraulic fluid to and from said X-axis and said Y-axis cylinders, and wherein said control unit is operatively connected to said X-axis and said Y-axis linear encoders so as to receive the output of said X-axis and said Y-axis linear encoders, and said control unit is operatively connected to said X-axis and said Y-axis cylinders via said respective electric/hydraulic servo valves so as to control said X-axis and said Y-axis cylinders by controlling the positions of said respective electric/hydraulic servo valves based on the machining data and the output of said X-axis and said Y-axis linear encoders.

7. A controller of a rivetting machine having a hydraulic cylinder, and a motor and a hydraulic power source connected to said hydraulic cylinder, the cylinder including a piston shaft, a spindle extending through and journaled to said piston shaft and driven by said motor, a rivet head forming tool secured to the bottom end of said spindle, and a forming shaft supported by said rivet head forming tool, whereby said spindle is lowerable by said hydraulic cylinder to cause abutting contact between the bottom end face of said forming shaft and the top end face of a work rivet and at the same time said spindle is rotatable by said motor to form a rivet head on the work rivet with said forming shaft, said controller comprising:

a linear encoder in operative association with said piston shaft so as to detect the axial position of said piston shaft;

an electric/hydraulic servo valve provided in a hydraulic circuit between said hydraulic power source and said hydraulic cylinder so as to control the flow of hydraulic fluid to and from said hydraulic cylinder, said hydraulic circuit including a hydraulic line extending to said hydraulic cylinder;

an electromagnetic pressure control valve operatively hydraulically connected in said hydraulic line so as to control the pressure of hydraulic fluid flowing therethrough to said cylinder;

a pressure sensor operatively connected to said hydraulic line so as to sense the pressure of hydraulic fluid in said hydraulic line; and a control unit programmable to receive machine data for rivets to be worked by the riveting machine, said control unit being operatively connected to said linear encoder so as to receive the output of said linear encoder, said control unit being operatively connected to said hydraulic cylinder via at least said electric/hydraulic servo valve so as to control said hydraulic cylinder by controlling the position of said electric/hydraulic servo valve based on the machining data and the output of said linear encoder, said control unit being operatively connected to said electromagnetic pressure control valve to regulate the pressure of hydraulic fluid flowing through said hydraulic line based on the machining data for a rivet to be worked, and said control unit also being operatively connected to said pressure sensor so as to monitor the pressure in said hydraulic line and effect a control of said electric/hydraulic servo valve, based on said monitoring of the pressure in said hydraulic line during an extension of said piston shaft, which causes said piston shaft to retract when said piston shaft has moved a predetermined stroke without the pressure in said hydraulic line having increased thereby detecting that a rivet is not disposed in a position to be worked by said forming shaft.

8. A controller of a rivetting machine as claimed in claim 7 and in which machine a work table is movable relative to said spindle in X and Y directions in a plane extending perpendicular to the longitudinal axis of said spindle, and X-axis and Y-axis hydraulic cylinders are operatively connected to said work table so as to move said work table in said X and Y directions to locate work rivets supported on said work table at a predetermined position relative to said spindle, and further comprising an X-axis linear encoder and a Y-axis linear encoder in operative association with said work table so as to detect the position of said work table in said plane relative to said piston shaft, respective electric/hydraulic servo valves provided in respective hydraulic circuits between said hydraulic power source and said X-axis and said Y-axis cylinders, respectively, so as to control the flow of hydraulic fluid to and from said X-axis and said Y-axis cylinders, and wherein said control unit is operatively connected to said X-axis and said Y-axis linear encoders so as to receive the output of said X-axis and said Y-axis linear encoders, and said control unit is operatively connected to said X-axis and said Y-axis cylinders via said respective electric/hydraulic servo valves so as to control said X-axis and said Y-axis cylinders by controlling the positions of said respective electric/hydraulic servo valves based on the machining data and the output of said X-axis and said Y-axis linear encoders.

9. A rivetting machine comprising: a hydraulic cylinder; a motor and a hydraulic power source connected to said hydraulic cylinder; the cylinder including a piston shaft, a spindle extending through and journaled to said piston shaft and driven by said motor, a rivet head forming tool detachably secured to the bottom end of said spindle, and a forming shaft supported by said rivet head forming tool, whereby said spindle is lowerable by said hydraulic cylinder to cause abutting contact between the bottom end face of said forming shaft and the top end face of a work rivet and at the same time said spindle is rotatable by said motor to form a rivet head on the work rivet with said forming shaft; a press jig detachably securable to the bottom end of said spindle in place of said rivet head forming tool whereby the press jig when secured to the bottom end of said spindle can press-fit rivets into holes formed in a sheet when said piston shaft is extended; and a controller including a linear encoder in operative association with said piston shaft so as to detect the axial position of said piston shaft, an electric/hydraulic servo valve provided in a hydraulic circuit between said hydraulic power source and said hydraulic cylinder so as to control the flow of hydraulic fluid to and from said hydraulic cylinder, said hydraulic circuit including a hydraulic line extending to said hydraulic cylinder, a pressure sensor operatively connected to said hydraulic line so as to sense the pressure of hydraulic fluid in said hydraulic line, and a control unit programmable to receive machining data for rivets to be worked by the riveting machine, said control unit being operatively connected to said linear encoder so as to receive the output of said linear encoder, said control unit being operatively connected to said hydraulic cylinder via at least said electric/hydraulic servo valve so as to control said hydraulic cylinder by controlling the position of said electric/hydraulic servo valve based on the machining data and the output of said linear encoder, and said control unit also being operatively connected to said pressure sensor so as to monitor the pressure in said hydraulic line and effect a control of said hydraulic circuit, while the pressure in said hydraulic line is monitored, which selectively operates said hydraulic cylinder in a rivet head forming mode when said rivet head forming tool is secured to the bottom end of said spindle and a press-fitting mode when the press jig is secured to the bottom end of said spindle.

10. a rivetting machine as claimed in claim 9, and further comprising a work table movable relative to said spindle in X and Y directions in a plane extending perpendicular to the longitudinal axis of said spindle, and X-axis and Y-axis hydraulic cylinders operatively connected to said work table so as to move said work table in said X and Y directions to locate work rivets supported on said work table at a predetermined position relative to said spindle, and wherein said controller further includes an X-axis linear encoder and a Y-axis linear encoder in operative association with said work table so as to detect the position of said work table in said plane relative to said piston shaft, respective electric/hydraulic servo valves provided in respective hydraulic circuits between said hydraulic power source and said X-axis and said Y-axis cylinders, respectively, so as to control the flow of hydraulic fluid to and from said X-axis and Y-axis cylinders, said control unit being operatively connected to said X-axis and said Y-axis linear encoders so as to receive the output of said X-axis and said Y-axis linear encoders, and said control unit being operatively connected to said X-axis and said Y-axis cylinders via said respective electric/hydraulic servo valves so as to control said X-axis and said Y-axis cylinders by controlling the positions of said respective electric/hydraulic servo valves based on the machining data and the output of said X-axis and said Y-axis linear encoders.

* * * * *